United States Patent [19]

Fujiwara

[11] Patent Number: 4,945,963
[45] Date of Patent: Aug. 7, 1990

[54] RADIAL TIRE TREAD PATTERN HAVING SHOULDER BLOCKS

[75] Inventor: Kenichi Fujiwara, Miki, Japan

[73] Assignee: Sumitomo Rubber Industries, Ltd., Hyogo, Japan

[21] Appl. No.: 218,260

[22] Filed: Jul. 13, 1988

[30] Foreign Application Priority Data

Jul. 13, 1987 [JP] Japan .............................. 62-107729[U]

[51] Int. Cl.$^5$ .............................................. B60C 11/06
[52] U.S. Cl. ................................................ 152/209 R
[58] Field of Search .......... 152/209 R, 209 D, 209 A, 152/DIG. 3

[56] References Cited

U.S. PATENT DOCUMENTS

| | | | |
|---|---|---|---|
| 2,104,532 | 1/1938 | Sommer | 152/DIG. 3 |
| 3,550,665 | 12/1970 | Verdier | 152/209 R |
| 3,799,230 | 3/1974 | Montagne | 152/209 R |
| 3,831,654 | 8/1974 | Boileau | 152/209 R |

FOREIGN PATENT DOCUMENTS 197735 10/1986 European Pat. Off. ........ 152/209 D

Primary Examiner—Michael W. Ball
Assistant Examiner—Geoffrey L. Knable
Attorney, Agent, or Firm—Birch, Stewart, Kolasch & Birch

[57] ABSTRACT

A radial tire comprising a tread having a tread pattern wherein at least two longitudinal grooves are formed in a zigzag-shaped configuration in the circumferential direction of the tire, and transverse grooves extending from each of the two outermost grooves of the longitudinal grooves to each tread end. The transverse grooves are arranged to form shoulder blocks circumferentially at substantially regular intervals with the difference between the maximum value and the minimum value in the total of the areas of the circumferentially opposed sides of the shoulder block being maintained within 10% of the maximum value, whereby the resistance to heel-and-toe abrasion and the durability of the tire are improved without impairing the wet grip characteristics of the tire.

7 Claims, 4 Drawing Sheets

Total of Areas of Circumferentially
Opposed Sides of Shoulder Block

RADIAL TIRE TREAD PATTERN HAVING SHOULDER BLOCKS

The present invention relates to a radial tire, and more particularly to an improved radial tire suited particularly for trucks, busses or any other heavy load vehicles, which is improved in durability against high speed and wet grip characteristic (wet-road holding property) and which has a tread pattern capable of reducing an irregular or partial wear in the shoulder blocks of both shoulder portions of the tread thereof.

In general, as shown in FIG. 5(a), radial tires, particularly radial tires for heavy load, are constructed such that they are provided with toroidal carcass C in which carcass cords are arranged in the radial direction of tire and both end portions thereof are turned up around bead cores, breaker Q which is composed of layers of steel cords arranged at relatively low angles in the circumferential direction of tire and which is located outside the crown portion of the carcass P, and tread portion R disposed outside the breaker Q. The tread portion is provided with a tread pattern on its surface by forming ribs, lugs, a combination of ribs and lugs, blocks and the like to thereby achieve the driving effect, braking effect, direction controlling effect, steering stability, and other necessary effects of the tires.

In this kind of conventional tires, however, simultaneous compliance with the requirements for their steering stability, service lives against abrasion, durability and the like necessarily involves an increase in the thickness of the tread rubber, particularly at both end portions of the tread. As a result, conventional tires of this kind causes heat generation resulting from their repeated deformation under service conditions of high load and high speed. Moreover, such heat generation causes the rubber to be exfoliated at both ends of the breaker, conjointly with the concentration of stresses on both ends of the breaker.

On the other hand, in order to improve the heat radiating effect and wet grip property of the tread rubber, it is proposed to provide transverse grooves S in both side regions of the tread which are defined by circumferentially extending main grooves G, to form a great number of shoulder blocks B, as shown in FIG. 5(b). However, this method causes so-called "heel-and-toe wear" in which the blocks B are partially subjected to abrasion in an early stage.

It is an object of the present invention to eliminate the above-mentioned disadvantages of conventional radial tires.

A further object of the present invention is to provide a radial tire in which the durability is improved and the heel-and-toe wear is greatly reduced without impairing the wet grip property.

These and other objects of the present invention will become apparent from the description hereinafter.

It has now been found that the above-mentioned objects can be achieved by a particular tread pattern wherein at least two longitudinal grooves are formed in a zigzag-shaped configuration in the circumferential direction of tire and transverse grooves are formed in both shoulder portions to extend from each of two outermost grooves of said at least two longitudinal grooves to each end of tread portion, thereby forming particular shoulder blocks circumferentially at approximately regular intervals.

In accordance with the present invention, there is provided a radial tire in which shoulder blocks are circumferentially formed at substantially regular intervals of place by means of transverse grooves which are communicatively connected to the ends of the tread portion thereof from at least two longitudinal grooves which extend in a zigzag-shaped configuration and circumferentially of said tire, characterized in that the shoulder blocks remain constant in the difference in the total of the areas of their circumferentially opposed sides A1 and A2 among them within the limits of 10%.

In a preferred embodiment of the present invention, at least 4 shoulder blocks are formed per pitch of the zigzag-shape.

An embodiment of the present invention will now be described with reference to the accompanying drawings, in which.

Referring to FIGS. 1 to 4, a radial tire 1 of the present invention has, in a tread 2 thereof, four zigzag-shaped longitudinal grooves G1, G2, G3 and G4 extending circumferentially of the tire. Also, the tread 2 has side portions R1 and R2 formed in a zigzag-shaped configuration between the outermost longitudinal grooves G1, G4 and end portions B1, B2 of the tread. These side portions R1 and R2 are provided with a great number of transverse grooves 3 which are communicatively connected from the above-mentioned longitudinal grooves G1 and G4 to the end portions B1 and B2 of the tread 2 so that the above-mentioned side portions R1 and R2 of the tread are divided into a large number of shoulder blocks B1, B2 . . . Bn, thereby achieving the enhancement of the heat radiating effect and wet-road holding effect of the tire. The transverse grooves may be arranged at an angle of 0 to 45 degrees to the axial direction of the tire. In the embodiment shown in FIG. 1, the transverse grooves are arranged at 30 degrees to the axial direction.

The transverse grooves 3 are desired to have a depth d of 50 to 110% of the depth of the longitudinal grooves and a width of 0.5 to 5 mm, and to be located at substantially regular intervals l of 5 to 20 mm from the viewpoint of the wet-road holding effect and heat radiating effect of the tire. Also, the transverse grooves are required to be four or more in number for each pitch P of the zigzag longitudinal grooves. If the number of transverse grooves are less than 4 per pitch P, the heat radiating effect and wet-road holding effect are poor. Also, the regular intervals required for the location of the transverse grooves must range between 1 and 1.3 in terms of the interval ratio between every two adjacent transverse grooves. If this ratio exceeds 1.3 a great difference is made among the shoulder blocks in their contract pressure against the earth. This causes irregular wear of the tire.

Figure 3:
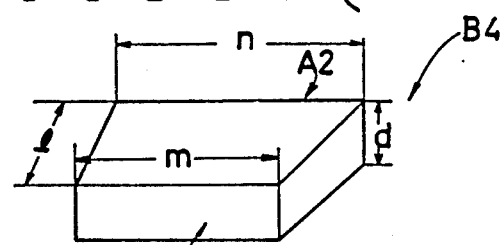
FIG. 3 is a schematic view of the shoulder block of the radial tire.

Moreover, the area total of both the circumferentially opposed sides of the shoulder blocks B1 ... Bn, which can be expressed in terms of the values of (md+nd) with reference to FIG. 3 showinjg the shoulder block B4 typically are required to remain constant in any shoulder block within the limits of 10 percent difference. That is to say, the difference between the maximum value and minimum value of said area totals must be restricted to 10% of the maximum value. In the term (md+nd), the symbols "m" and "n" respectively correspond to the length of the rectangular side A1 and that of the rectangular side A2 of each shoulder block, as is apparent from FIG. 3 of the shoulder block B4 typically depicted.

Figure 1:
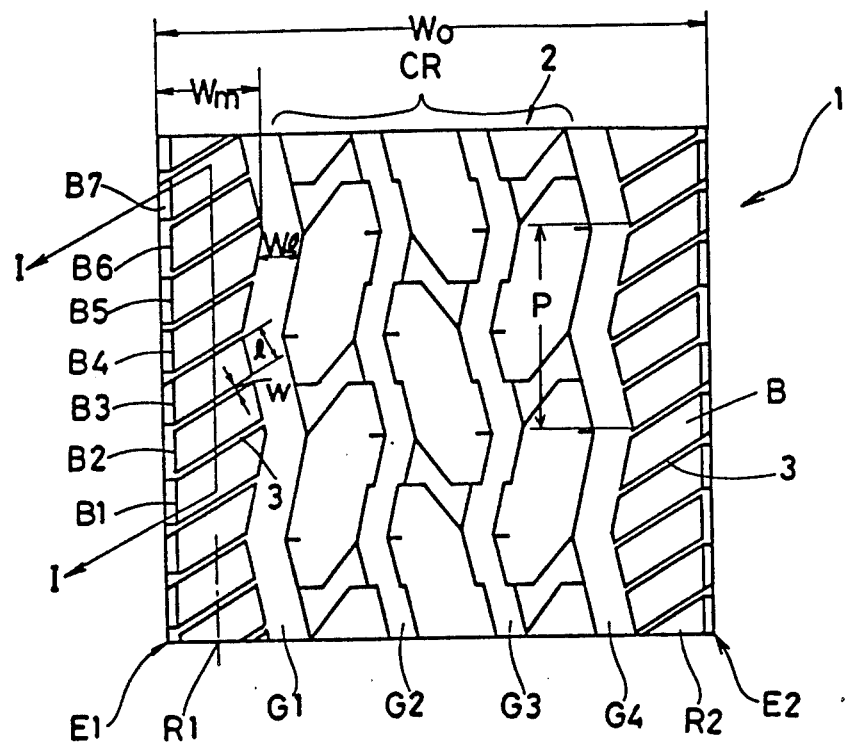
FIG. 1 is a front view showing an embodiment of the tread pattern of the radial tire according to the present invention.
Figure 2:
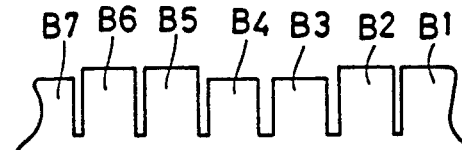
FIG. 2 is a sectional view taken along the line I—I of FIG. 1.

The inventor's empirical knowledge is that the zig-zag-shaped longitudinal grooves create differences in the rigidity of the shoulder blocks sectionally formed by means of at least four transverse grooves made at substantially regular intervals over each pitch of the zig-zag-shaped longitudinal grooves in both zigzag-shaped side portions of the tread, and as a result, shoulder blocks of higher rigidity carry a heavy load, thereby causing the occurrence of greater wear on the tire portions of such shoulder blocks. That is, to say, as illustrated in FIG. 2, the shoulder blocks of smaller transverse length such as the shoulder blocks B3 and B4 are higher in their rigidity on their ends and greater in their wear than the other shoulder blocks, for example, B1 and B2.

Figure 7:
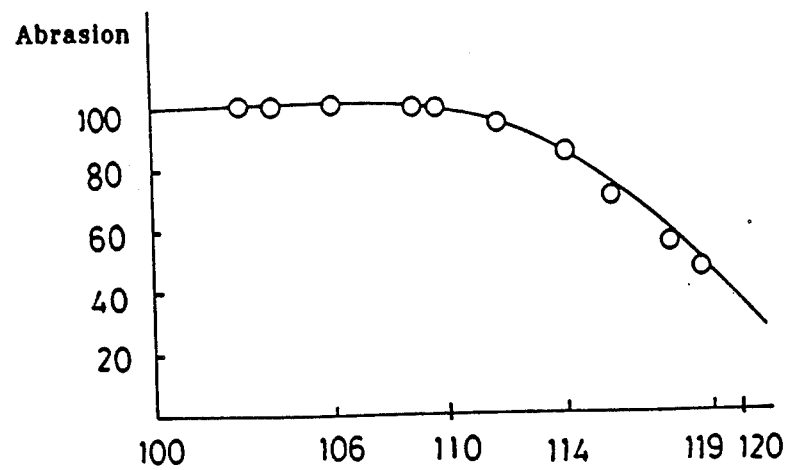
FIG. 7 is a graph showing the relationship between the area total of the circumferentially opposed sides of each shoulder block and the abrasive amount of each shoulder block.

The rigidity of each shoulder block is in inversely proportional to the total of the areas of the circumferentially opposed sides A1 and A2 thereof. For this reasoti, in order to allow the shoulder blocks to hold constant rigidity, the shoulder blocks are respectively required to have substantially the same total of such areas. It has been experimentally found that any excess of 10 percent ratio of the greatest area total to the smallest area total of the circumferentially opposed sides increases the difference in abrasive amount among the shoulder blocks, as shown in the graph of FIG. 7 in which the totals of the areas of the circumferentially opposed sides of the shoulder blocks are plotted along the abscissa, and the abrasive amounts of the shoulder blocks along the ordinate.

Figure 4:
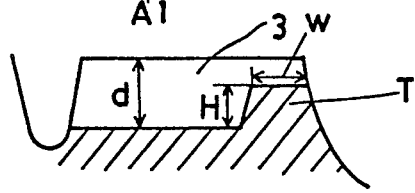
FIG. 4 is a schematic view showing an embodiment of the transverse groove of the tire according to the present invention.

Under the circumstances, in order to adjust the areas of the circumferentially opposed sides A1 and A2, the depth d of the transverse grooves 3 is changed, and moreover, a tie bar T is formed in a variety of shapes on the bottom portion of each or any of the opposed sides so that the bottom of a corresponding transverse groove is raised in shape as shown in FIG. 4.

In the present invention, it is preferable that the maximum width Wm of the side portions R1, R2 of the tread ranges between 10% and 30% of the tread width Wo, and the width W1 of the lingitudinal grooves G1 and G4 ranges between 2% and 5% of the tread Wo. Also, the longitudinal grooves are required to be at least two in number, and the crown region CR interposed between the longitudinal grooves G1 and G4 which form the side portions R1 and R2 of the tread may have either a ribbed shape or a block shape. In this embodiment of the utility model, a block shape of the crown region is selected.

Moreover, although the present invention is best applied to radial tires for use on trucks, busses and other heavy duty type vehicles, it is to be understood that the present invention can be also applied to radial tires for pickup trucks and othe small-sized vehicles as long as the tires have the longitudinal main grooves made in a zigzag-shaped configuration.

Examples

Figure 5A:
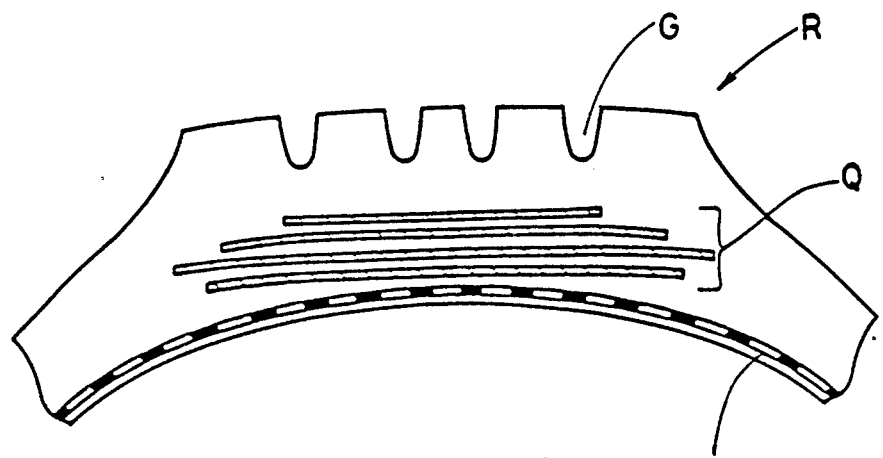
FIG. 5(a) is a partial sectional view of the tire.
Figure 5B:
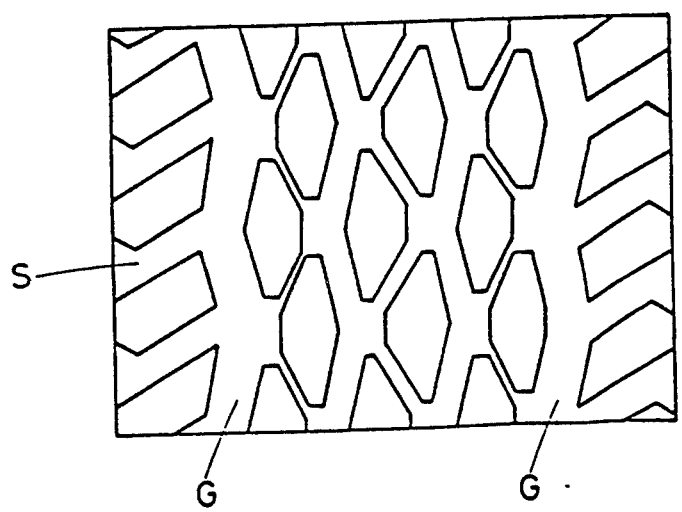
FIG. 5(b) is a plan view showing the tread pattern of a tire of the prior art.
Figure 6A:
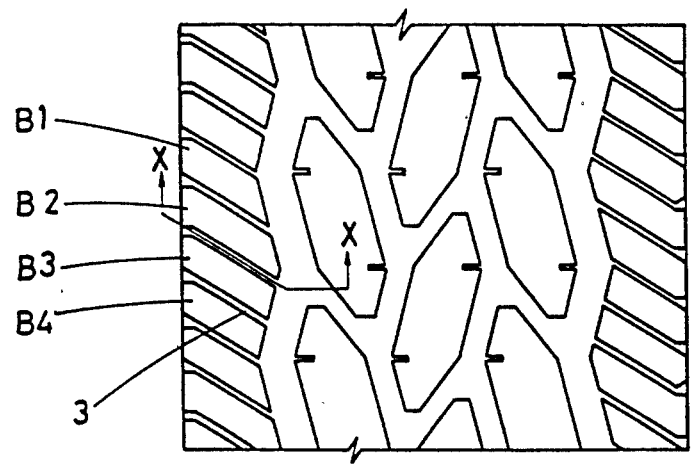
FIG. 6(a) is a plan view showing the tread pattern of the tire of the invention used in the Examples described hereafter.
Figure 6B:
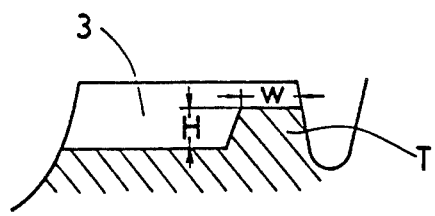
FIG. 6(b) is a sectional view taken along the line X—X of FIG. 6(a)

A radial tire of the present invention in which a tread pattern is made as shown in FIG. 5(a), and the transverse grooves 3 sectioning the shoulder portions into blocks B2 and B3 are provided with the tie bars 3 as shown in FIG. 6(b) to furnish the transverse grooves with raised shapes, and a second radial tire for comparative use in which the transverse grooves are not equipped with the tie bars were both subjected to 60,000 km running tests under the testing conditions of 7.25 kg/cm$^2$ in their internal air pressure, 7.50 V×20 in the size of their rims, and 2,425 kg in a load upon said both tires to compare the wear of the shoulder blocks between both tires. The running road was a 100% asphalt-paved road. Also, specifications for the shoulder blocks of the two tested tires are as given in Tables 1 and 2 hereinafter presented. The worn degrees of the shoulder blocks of both tested tires are indicated in the form of the index numbers in Tables 1 and 2. The smaller index numbers signify that the worn degrees are also lower. Tables 1 and 2 show that in the tire according to an embodiment of the present invention, the shoulder blocks are substantially equalized in their worn degrees to the difference of 2 percent or below, while on the other hand, the second tire of the conventional kind for comparative use has a maximum of 50 percent difference in the worn degrees among the shoulder blocks thereof, and undergoes great irregular wear in the shoulder blocks thereof. As is apparent from the results of the compartive tests, the present invention produces great effect upon reduction in the wear or abrasion of the radial tires.

TABLE 1

| | Wear Test Results of Tire of The Invention | | | |
|---|---|---|---|---|
| Shoulder Blocks | Circumferentially Opposed Side Area A1, (m × d) − (W × × H) | Circumferentially Opposed Side Area A2, (m × d) − (W × × H) | Ratio of (A1 + A2) among Shoulder Blocks | Index Number of Wear |
| B1 | 28 × 13.5 | 34 × 13.5 | 103 | 99 |
| B2 | 34.5 × 13.5 | 37 × 13.5 − 14 × 8.5 (*1) | 104 | 98 |
| B3 | 36.5 × 13.5 − 14 × 8.5 (*2) | 32 × 13.5 | 100 | 100 |

TABLE 1-continued

Wear Test Results of Tire of The Invention

| Shoulder Blocks | Circumferentially Opposed Side Area A1, (m × d) − (W × H) | Circumferentially Opposed Side Area A2, (m × d) − (W × H) | Ratio of (A1 + A2) among Shoulder Blocks | Index Number of Wear |
|---|---|---|---|---|
| B4 | 32.0 × 13.5 | 28 × 13.5 | 100 | 100 |

TABLE 2

Wear Test Results of Conventional Type Tire of Comparative Use

| Shoulder Blocks | Circumferentially Opposed Side Area A1, (m × d) | Circumferentially Opposed Side Area A2, (n × d) | Ratio of (A1 + A2) among Shoulder Blocks | Index Number of Wear |
|---|---|---|---|---|
| B1 | 28 × 13.5 | 34 × 13.5 | 103 | 99 |
| B2 | 34.5 × 13.5 | 37 × 13.5 | 119 | 50 |
| B3 | 36.5 × 13.5 | 32 × 13.5 | 114 | 85 |
| B4 | 32.0 × 13.5 | 28 × 13.5 | 100 | 100 |

Notes
(1*) and (*2): It is to be noted that the marks (*1) and (*2) show that the transverse groove between the shoulder blocks B2 and B3 is provided with a tie bar of 8.5 mm in height from the bottom thereof and 14 mm in width to limit to 10 percent or less the difference in the total area of the circumferentially opposed sides A1 and A2 among the shoulder blocks.

As is apparent from the foregoing description, the radial tire of the present invention has at least four shoulder blocks circumferentially formed at regular intervals within each pitch of the zigzag-shaped longitudinal grooves in the side portions of the tread between the zigzag-shaped longitudinal grooves and the ends of the tread to achieve improvement in the wet-road holding property and heat radiating effect of the tire, and moreover, the tire is arranged to be designed to any desired shape or depth of the transverse groove or grooves which sectionally form the shoulder blocks, whereby the shoulder blocks are allowed to remain constant in their rigidity. For this reason, the radial tire of the present invention achieves the prevention of any irregular or partial wear thereof, and is simultaneously capable of reducing the exfoliation of the rubber from the end portions of the breaker thereof without any impairment in the wet-road holding property and the heat radiating effect which can be caused by the transverse grooves. As a result, the radial tire of the present invention is more improved in the durability thereof.

I claim:
1. A radial tire, having
    a tread provided with at least two zigzag longitudinal grooves, each containing a plurality of zigzag pitches, said longitudinal grooves extending circumferentially of the tire to define a tread shoulder portion between each of the outermost longitudinal grooves and each tread edge, and transverse grooves extending between said outermost longitudinal grooves and the tread edges to divide each of the tread shoulder portions into shoulder blocks, each having circumferentially opposed sidewalls, said transverse grooves being arranged circumferentially so as to have at least four transverse grooves per single zigzag pitch of the longitudinal grooves, wherein the sidewall area total of each shoulder block is defined as the total of the area of one of said circumferentially opposed sidewalls thereof and that of the other, and
    the difference between a maximum and a minimum in the sidewall area totals is not more than 10% of the maximum, wherein
    in the transverse grooves in each zigzag pitch, at least the longest transverse groove is provided with a raised portion to decrease the sidewall area of the adjacent shoulder block so that the difference between the maximum value and the minimum value of the sidewall area totals is not more than 10% of the maximum value.

2. The radial tire of claim 1, wherein at least four shoulder blocks are provided per pitch of the zigzag-shaped longitudinal groove.

3. The radial tire of claim 1, wherein each of said shoulder blocks has a width of 5 to 20 mm in the circumferential direction.

4. The radial tire of claim 1, wherein said transverse grooves have a depth of 50 to 110% of the depth of said longitudinal groove and a width of 0.5 to 5 mm.

5. The radial tire of claim 1, wherein the maximum length between the axially outer wall of each said outermost longitudinal groove and the tread end is from 10 to 30% of the width of said tread.

6. The radial tire of claim 1, wherein said longitudinal grooves have a width of 2 to 5% of the width of said tread.

7. The radial tire of claim 1, wherein two zigzag-shaped longitudinal grooves are provided between said two outermost longitudinal grooves.

* * * * *